United States Patent
Fink et al.

(10) Patent No.: US 7,508,734 B2
(45) Date of Patent: Mar. 24, 2009

(54) METHOD AND APPARATUS FOR ACOUSTIC DATA TRANSMISSION IN A SUBTERRANEAN WELL

(75) Inventors: Kevin D. Fink, Frisco, TX (US); Donald G. Kyle, The Colony, TX (US); Michael L. Fripp, Carrollton, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 11/633,264

(22) Filed: Dec. 4, 2006

(65) Prior Publication Data

US 2008/0130412 A1   Jun. 5, 2008

(51) Int. Cl.
*G01V 1/00* (2006.01)
(52) U.S. Cl. .............. 367/43; 367/56; 702/17
(58) Field of Classification Search ........... 702/17; 367/43, 56
See application file for complete search history.

(56) References Cited

U.S. PATENT DOCUMENTS

| | | | |
|---|---|---|---|
| 3,252,225 A | 5/1966 | Hixson | |
| 3,881,168 A * | 4/1975 | Farr et al. | 367/48 |
| 4,314,365 A | 2/1982 | Petersen | |
| 4,390,975 A | 6/1983 | Shawhan | |
| 4,562,559 A | 12/1985 | Sharp | |
| 4,692,909 A * | 9/1987 | Gard et al. | 367/45 |
| 4,964,087 A * | 10/1990 | Widrow | 367/45 |
| 5,050,132 A | 9/1991 | Duckworth | |
| 5,124,953 A | 6/1992 | Grosso | |
| 5,128,901 A | 7/1992 | Drumheller | |
| 5,148,407 A * | 9/1992 | Haldorsen et al. | 367/32 |
| 5,148,408 A | 9/1992 | Matthews | |
| 5,293,937 A | 3/1994 | Schultz | |
| 5,303,203 A * | 4/1994 | Kingman | 367/75 |
| 5,448,531 A * | 9/1995 | Dragoset, Jr. | 367/45 |
| 5,555,530 A * | 9/1996 | Meehan | 367/45 |
| 6,246,962 B1 | 6/2001 | Schultz | |
| 6,253,156 B1 * | 6/2001 | Bui-Tran et al. | 702/17 |
| 6,384,738 B1 | 5/2002 | Carstensen | |
| 6,434,084 B1 | 8/2002 | Schultz | |
| 6,446,008 B1 * | 9/2002 | Ozbek | 702/17 |
| 6,449,560 B1 * | 9/2002 | Kimball | 702/6 |
| 6,583,729 B1 * | 6/2003 | Gardner et al. | 340/855.4 |
| 6,710,720 B2 | 3/2004 | Carstensen | |
| 6,933,856 B2 | 8/2005 | Schultz | |
| 7,053,787 B2 | 5/2006 | Schultz et al. | |
| 7,061,932 B2 | 6/2006 | Gardner et al. | |
| 7,063,146 B2 | 6/2006 | Schultz et al. | |

(Continued)

OTHER PUBLICATIONS

DeJestis et al. Adapative neural network filtering device for enhanced downhole oilfield measurements. The 2002 45th Midwest Symposium on Circuits and Systems 2002. Aug. 4-7, 2002. vol. 3. pp. III101-III104.*

*Primary Examiner*—Mark Hellner
(74) *Attorney, Agent, or Firm*—Peter Schroeder

(57) ABSTRACT

The disclosure describes a method and apparatus for effectively communicating data along an acoustic transmission path. The method comprises driving an acoustic transmitter to send a data signal along the acoustic transmission path, where the signal is distorted by ambient noise. The distorted signal is input to a spaced apart plurality of sensors so that consequent time-delayed signals provide reinforcement of the basic signal and attenuation of the ambient noise component when combined.

8 Claims, 4 Drawing Sheets

U.S. PATENT DOCUMENTS

| | | | |
|---|---|---|---|
| 7,068,183 B2 * | 6/2006 | Shah et al. | 340/854.4 |
| 7,206,255 B2 * | 4/2007 | Ukita | 367/38 |
| 7,210,555 B2 * | 5/2007 | Shah et al. | 181/108 |
| 7,260,163 B2 * | 8/2007 | Li et al. | 375/350 |
| 2005/0107079 A1 | 5/2005 | Schultz | |
| 2006/0000665 A1 * | 1/2006 | Shah et al. | 181/108 |
| 2006/0001549 A1 * | 1/2006 | Shah et al. | 340/854.4 |
| 2006/0002232 A1 * | 1/2006 | Shah et al. | 367/82 |
| 2006/0044939 A1 * | 3/2006 | Shah et al. | 367/82 |
| 2006/0070743 A1 * | 4/2006 | Shah et al. | 166/382 |
| 2006/0219438 A1 * | 10/2006 | Moore et al. | 175/50 |

* cited by examiner

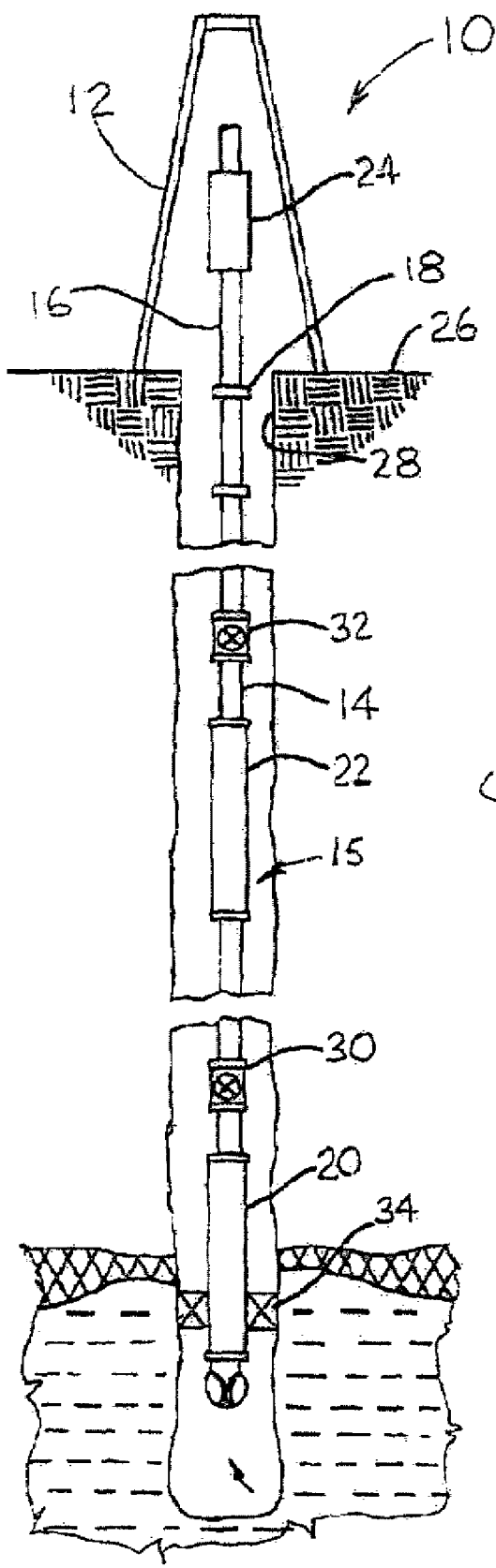
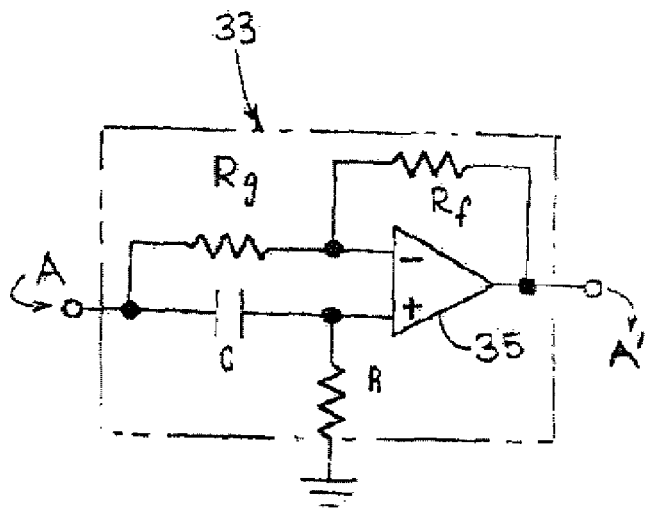
FIG. 2
FIG. 1
PRIOR ART

METHOD AND APPARATUS FOR ACOUSTIC DATA TRANSMISSION IN A SUBTERRANEAN WELL

CROSS-REFERENCE TO RELATED APPLICATIONS

Not applicable

STATEMENT REGARDING FEDERALLY SPONSORED RESEARCH OR DEVELOPMENT

Not applicable

REFERENCE TO MICROFICHE APPENDIX

Not applicable

TECHNICAL FIELD

The present invention pertains to a system for transmitting acoustic data in an oil well environment and more particularly, to use of multiple sensors for reinforcement of the transmitted signal and attenuation of ambient noise.

BACKGROUND

Interest has increased in transmitting acoustic signals to and from locations in an oil well environment. The basic operating principal in acoustic signal transmission in a tubular media is to impart propagating stress-strain waves into a pipe or tubing string which travel within the pipe to a distant location where transducers detect the signal which is then interpreted by the receiving equipment. In this way, data and signals can be transmitted via mechanical tubular transmission channels such as pipe or tubing.

There are practical problems in the transmission of acoustic signals. When tubing, drill pipe or casing is used as an acoustic transmission channel, significant signal distortion often occurs, due to reflective interfaces in the channel such as tool joints, collars or other upsets. Additionally, there can be significant attenuation and interference associated with the fluid system contained in the wellbore and echoes of the acoustic signals themselves within the wellbore. The receiver is subjected to noise from the operation of surface equipment and other external disturbance sources, as well as from fluid flow and other noise present in the acoustic channel. These factors significantly reduce the conditions under which acoustic data transmission may be effectively utilized. Acoustic data transmission may be limited by the distance of the transmission, the number and type of upsets in a drill string.

Efforts to effectively transmit data acoustically have often centered on careful control of the frequency and bandwidth of the transmission, the timing of the transmission and the duration of the transmission. U.S. Pat. No. 3,252,225 issued to Hixon and U.S. Pat. No. 4,314,365 issued to Petersen teach selection of transmission wave length based upon pipe characteristics such as the length of pipe sections and the overall length of the drill string. U.S. Pat. No. 4,390,975 issued to Shawhan suggests delaying successive acoustic data transmissions to allow reflections of earlier transmissions to dissipate. Similarly, U.S. Pat. No. 5,050,132 issued to Duckworth discloses transmissions of acoustic data signals only during pre-selected short time intervals to avoid data distortion. U.S. Pat. No. 5,124,953 issued to Grosso discloses selecting a passband frequency for acoustic data transmission that best correlates a measured and a modeled spectral density of the acoustic transmission. U.S. Pat. No. 5,148,408 issued to Matthews similarly suggests the testing and finding of an optimum frequency for acoustic data transmission which results in the most efficient reception of the acoustic data under the circumstances then present in the well. The Matthews patent suggested period testing of data transmission through the drill string during drilling operations, finding an optimum frequency for transmission based upon drill string conditions at the time of testing, and changing the acoustic data transmission frequency as needed. U.S. Pat. No. 4,562,559 issued to Sharp et al, proposes a phase-shifted transmission wave having a broader frequency spectrum to bridge gaps in the passband frequencies. U.S. Pat. No. 5,128,901 issued to Drumheller proposes transmission of acoustic data conditioned to counteract interference caused by the drill string so as to enhance data transmission.

In some systems it is possible to model a communication channel before the system is placed in service and design an acoustic transmitter to compensate for the channel distortion. However, in an oil well, complexities of the acoustic transmission environment change constantly, defying any attempt to design a workable static acoustic transmitter. A receiver embodying a single sensor must accomplish all of the noise reduction in the electronics.

From the foregoing, it is apparent that a need exists for improved methods of acoustic data transmission and, in particular, a need exists for improved methods of acoustic data transmission in oil well environments. Furthermore, it would be most desirable to provide such methods for reinforcement of the basic control signal and attenuation of unwanted interference. If the noise is high, it can swamp the available signal. Thus, it is particularly desirable to have a method of reducing the noise prior to the digitization of the signal so as to increase the range and reliability of acoustic data transmission.

SUMMARY

The present invention describes methods and apparatus for effectively communicating data along the acoustic transmission path of a subterranean well. The method comprises driving an acoustic transmitter to send a data signal along the acoustic channel where the signal is distorted by ambient noise. The distorted signal is input to a plurality of sensors, with the sensor output then being combined. Signal time delays, imposed either before or after sensing, condition the signal so as to reinforce the basic signal and attenuate ambient noise when combined.

In a preferred embodiment of the present invention, a conventional acoustic transmitter is used along with a phased array utilizing a plurality of sensors. The sensors are placed at spaced apart locations along the drill string. The pre-selected and known distance between sensor locations is divided by the speed of acoustic propagation of the chosen signal frequency (f) to indicate the time shift, or delay, to be imposed on the acoustic signals as measured by the sensors. A signal sent from the transmitter as an acoustic pulse travels along the acoustic transmission path, accompanied and distorted by the addition of ambient noise, and is sensed at spaced intervals by each of the sensors. Then, combining time delayed sensor outputs, by addition or multiplication, provides a reinforced signal at the receiver. Inasmuch as the ambient noise is "off-frequency", it is not reinforced in a similar manner and is relatively diminished at the receiver.

In another preferred embodiment of the present invention utilizing spatial filters, the transmitter is encoded to provide an output consisting of a summation of the basic signal and varying time-delay versions of that transmitted signal. The time delay between the basic signal and each subsequent time-delayed signal equals the time it takes to pass between the sensors at the receiver. The result is that the basic signal arrives at the most distant sensor at the same time that each time-delayed signal arrives at each sensor nearer to the source. Spatial filtering results in the transmitted signal being reinforced and magnified in amplitude whereas the magnitude of uncorrelated ambient noise will decrease.

Another preferred embodiment of the present inventions utilizes adaptive techniques and multiple sensors to reduce the effects of ambient noise on data transmission in an oil well environment. A sensor is added to the receiver input to measure a reference noise in order to help cancel or reduce the effects of ambient noise received at the receiver input sensors. The sensor for measuring the reference noise typically may be placed out of the direct transmission path, at a location that would feature a reduced signal from the transmitter. The noise reference is given a frequency weight and then subtracted from the measured sensor signal. The frequency weights account for the frequency response of the transmission path between the noise reference and the sensors and typically apply a gain and phase that changes with frequency. Adaptive techniques, such as the adaptive feed-forward technique, may be utilized to allow adaptation to changes in the transmission path.

BRIEF DESCRIPTION OF THE DRAWINGS

The accompanying drawings are incorporated into the specification to assist in explaining the present invention. The drawings illustrate preferred and alternative examples of how the invention can be made and used and are not to be construed as limiting the invention to only those examples illustrated and described. The various advantages and features of the present invention will be apparent from a consideration of the drawings in which:

FIG. 1 shows the general arrangement of acoustic telemetry components in an oil well;

FIG. 2 is a schematic view of a time delay circuit which may be used in the present inventions;

DETAILED DESCRIPTION OF THE DRAWINGS

Figure 3:
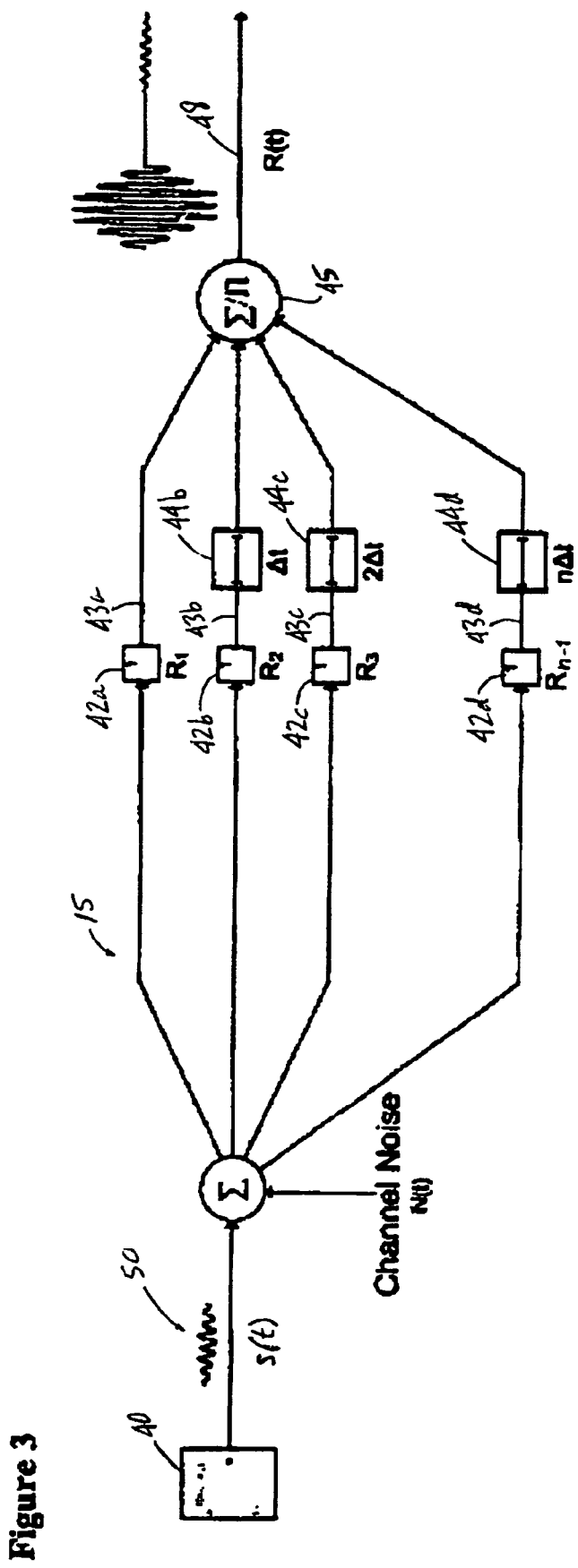
FIG. 3 is a schematic view of a first preferred embodiment of the present inventions.

The present invention teaches a method for reinforcing an acoustic signal transmitted in an oil well environment, while suppressing unwanted noise, and is described in the following by referring to drawings of examples of how the invention can be made and used. In these drawings, reference characters are used throughout the views to indicate corresponding components. The embodiments shown and described herein are exemplary. Some details are well known in the arts, and as such may be neither shown nor described.

FIG. 1 is a representational view of a typical subterranean drilling apparatus 10. Drilling rig 12 operates to support a drill string 14. The drill string 14 and the well bore 28 comprise an acoustic channel or transmission path 15. Acoustic transmission path 15 can include greater or fewer elements, depending on the drilling, testing or production operations underway and may include well parts or tools present at the time. The drill string 14 is made up of pipe sections 16 connected together by tool joints 18. The drill string 14 is used for operations within a wellbore 28 which may be cased along portions of its length. Depending on the circumstances at the well site, the drill string 14 may include valves 30 and 32, packers 34, subassemblies, collars or other upsets. The apparatus herein may be utilized during any well operations, including drilling, testing, completion and production. FIG. 1 shows communication units 20, 22 and 24 which may be placed on, in or near the drill string 14, below, at or above the surface 26, as shown. The communication units 20, 22 and 24 may be utilized for transmitting and/or receiving acoustic signals to and from locations within well bore 28. For example, communication unit 20 may transmit acoustic signals utilizing the methods described herein, to a receiver at communication unit 24.

FIG. 2 is a schematic view of the circuit of an analog op-amp constant time delay module 33 using a CLC428 linear integrated circuit 35, which may be used in subsequently disclosed embodiments of the present inventions. The signal input A is the same as the signal output A' but time-delayed by a designed period as determined by selected values of C and R. This circuit can be adapted to provide different time-delays by selecting other values of R and C, where the time-delay equals 2RC. The circuit, as illustrated, with Rg and Rf each having a value of 249 Ohms, a C value of 63 pF and a R value of 95.3 Ohms will impose a constant time-delay of approximately 0.5 milliseconds across the given frequency.

The time delay circuit can be utilized to provide constant time delay across the frequency of interest. In an analog circuit, constant time delay can be accomplished by providing linear roll-off in phase as frequency increases. The time delay circuit may utilize a first order Pade approximation of the Laplace transform of an ideal time delay. Higher-order Pade approximations of the Laplace transform can be used if a wider frequency response is needed or if more accuracy is desired.

FIG. 3 shows a preferred embodiment of the present invention utilizing a phased-array to reduce the effects of ambient noise on a transmitted signal in an oil well environment. A conventional communication unit 40 is used as a transmitter together with a plurality of sensors 42a, 42b, 42c and 42d. The sensors are placed at spaced apart locations along the acoustic transmission path 15. The signal frequency may be chosen for being out of the general range of noise from the operation of surface 6 equipment and other external and internal disturbance sources. The distance between locations of the receiver sensor 42 is predetermined and the speed of acoustic propagation (Vp) of the chosen signal frequency (f) is known. The time delay imposed on the signals as measured by the receiver sensors 42 can be calculated by dividing the distance between the sensors 42 by the speed of the acoustic transmission. The sensors 42 are preferably placed equidistant from one another, however any arrangement with known distances between the sensors is adequate. Three or more sensors will generally be used and, since the rate of acoustic propagation Vp in the acoustic medium, such as through steel, is known, the time delayed applied to the sensor outputs can be calculated.

A signal sent from transmitter 40 as acoustic pulse 50, or s(t), travels along the acoustic transmission channel 15, accompanied and distorted by the addition of ambient noise N(t). Acoustic pulse 50 is sensed along with channel ambient noise N(t) by each of the sensors 42a, 42b, 42c and 42d. Since sensor 42a is closest to the transmitter 40, its output to receiver 48 is ahead of the output of sensors 42b-d. The output from the sensors 42 are weighted by time delay weights 44. The time-delay (dt) is weighted as determined by the distance between the sensors 42. Preferably the sensors 42 are spaced equidistant from one another, simplifying the weights to multiples of (dt), such as (dt), 2(dt), 3(dt)...n(dt). However, other arrangements of sensors 42 may be used. The time delayed sensor outputs are combined 45 by multiplication or summation. The combined signal, or receiver signal 48, is effectively noise filtered. Inasmuch as ambient noise N(t) is non-correlated, it is not reinforced in a similar manner and is relatively diminished in the receiver signal 48. A greater number of sensors may be used to achieve even stronger signal reinforcement, the number being limited only by practical considerations.

Figure 4:
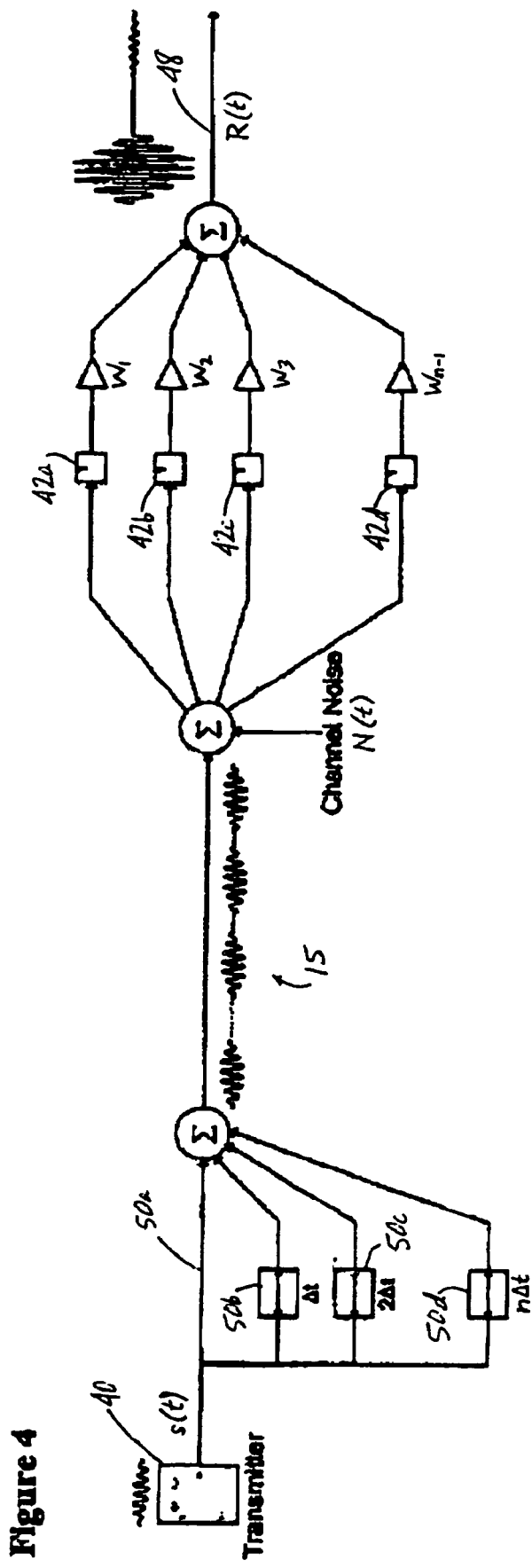
FIG. 4 is a schematic view of a second preferred embodiment of the present inventions.

FIG. 4 is a schematic view of a second preferred embodiment of the present invention utilizing spatial filters to reduce the effects of ambient noise on a data transmission in an oil well environment. An array of sensors 42*a*, 42*b*, 42*c* and 42*d* are employed in a receiver 48 at spaced apart locations along the acoustic transmission channel 15. Unlike in the phased array described above, with a spatial filter the transmitter 40 encodes the output signal 50 or s(t). The output signal 50, or a(t), of the transmitter 40 consists of a series 53 of the transmitted signal 50*a*, or s(t), and varying time delayed versions thereof, 50*b*, 50*c* and 50*d*, or s(t+dt), s(t+2dt) and s(t+3dt), respectively. In practice, the delayed signals may be transmitted with a small enough time delay that the signals 50*a-d* overlap to some degree. Where the signals overlap, the acoustic transmission is represented as a summation of the signals. The time delay between the signals is selected to correspond to the distances between the receiver sensors 42 such that when the first transmitted signal 50*a* reaches the sensor 42*d* furthest from the transmitter 40, each of the later-sent signals 50*b-d*, arrive at a corresponding sensor, 42*c*, 42*b* and 42 a, respectively.

In the example explained above, the sensors 42*a-d* are placed equidistant from one another, such that the time delays of the varying signals 50*b-d* are simply multiples of the same time delay, (dt). Other arrangements of sensors may be employed with the time delays between signals 50 spaced apart appropriately such that the transmitted signals 50 arrive at corresponding sensors 42 at the same time.

During transmission of the signal 50, ambient noise N(t) in the channel 15 is added to and interferes with the transmitted signal. The sensors 42*a-d* at the receiver 48 sense the arriving signals 50*a-d*. The received signals 50*a-d* are then combined 45, typically by summation, at the receiver for a resultant received signal R(t). The spatial filtering of the transmitted signal results in the reinforcement and magnification of the amplitude of the signal. The magnitude of the transmitted signal increases linearly with the number of sensors 42 utilized in the receiver 48. Meanwhile, uncorrelated noise, such as ambient noise N(t) in the acoustic channel 15 is reduced in amplitude as it is "off-frequency" with the transmitted signal 50. The magnitude of uncorrelated noise N(t) is decreases by one over the square root of the number of sensor elements 42 in the receiver 48. Uncorrelated noises, such as pump, sand, flow and other noises, will be reduced utilizing the spatial filter.

A problem with spatial filters is the potential for reflected transmitted signals to arrive at the sensors 42 simulating the transmitted signal 50. Such reflected signals are correlated noise. If an evenly weighted spatial filter is used, then reflected transmission signals are sensed equally with the intended transmission signal 50. The reflected signal is, of course, sensed in the reverse pattern from the transmitted signal 50. That is, for an equally-spaced array, the signal 50*a* is received at the sensor 42*a* closest to the transmitter 40 at the same time that each subsequent signal 50*b-d* is received at sensors 42*b-d*, respectively.

The problem of reflected signals is solved by unevenly weighting the transmitted signals 50*a-d*. With unevenly weighted signals 50*a-d* and uneven weighting of the sensors 42*a-d*, the reflected signal will not match the pattern of the transmitted signal. As a result, the spatial filter can be used to cancel the reflected signal. For example, sensors 42*a-d* may be utilized and the transmitted signal sent as time delayed signals 50*a-d*. The sensors 42*a-d* are weighted (W) prior to combination as [−1 1 1 1]. The time delayed signals 50*a-d* are amplitude weighted prior to transmission according to the pattern [−1 1 1 1]. The primary signal, signals 50*a*, 50*b*, 50*c*, and 50*d*, arrive simultaneously at respective sensors 42*d*, 42*c*, 42*b* and 42*a*. The measured output of the receiver 48 is the product of the sensor weights [−1 1 1 1] and the transmission weighted amplitude [−1 1 1 1]. The resulting measured signal has an amplitude of 4, calculated as ((−1×−1)+(1×1)+(1×1)+ (1×1)).

The reflected signal will have the reverse weighting and will effectively be cancelled upon summation of the weighted sensor signals. Using the same example, the reflected signal will arrive such that signals 50*a*, 50*b*, 50*c*, and 50*d* arrive simultaneously at respective sensors 42*a*, 42*b*, 42*c*, and 42*d*. As a result, when the reflected signals hit the sensors, the measured output at the receiver 48 is the product of [−1 1 1 1] and the sensor weights [1 1 1 −1], for a measured signal amplitude of zero, calculated as ((−1×1)+(1×1)+(1×1)+(−1× 1)).

Such uneven weighting of the spatial filter requires at least three sensors and corresponding signal components to cancel the reflected signal upon summation. The sensor weights or the transmission weights may have differing magnitudes, which are necessary if a 4-sensor receiver is utilized. However, there is no theoretical upper limit to the number of sensors utilized at the receiver. Practitioners will recognize that the same result can be reached through use of a single sensor receiving a series of time delayed signals with summation of the received time-delayed signals occurring at the receiver processor. In effect, it is possible to apply time delays at both the transmitter and receiver.

Figure 5:
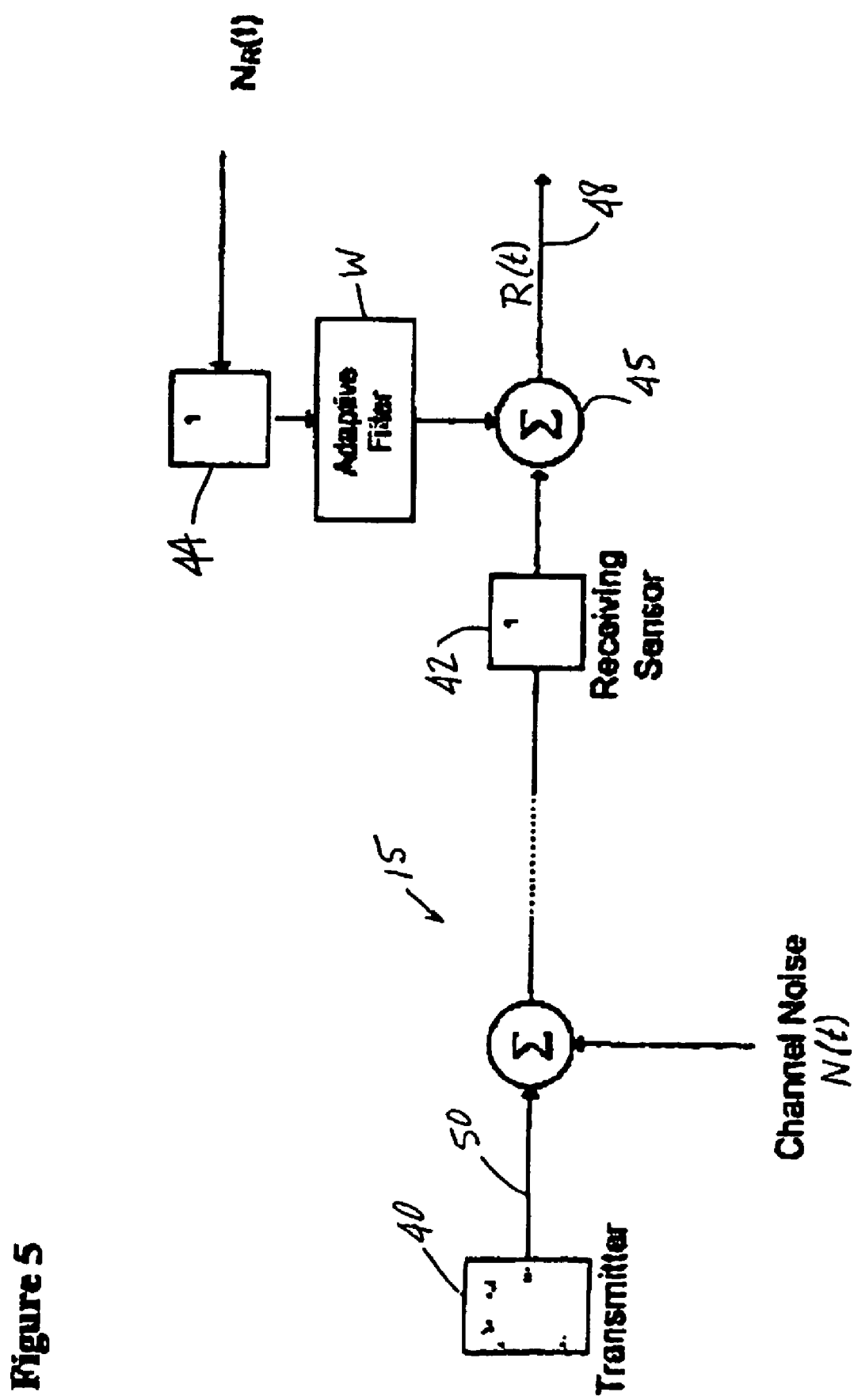
FIG. 5 is a schematic view of a third preferred embodiment of the present inventions.

FIG. 5 shows another preferred embodiment of the present inventions using multiple sensors and an adaptive filter. FIG. 5 shows communication transmission unit 40, with acoustic signal 50 sent to receiver 48 distorted by unwanted noise sources N(t) added along the acoustic transmission path 15. An adaptive filter utilizes a noise-sensing sensor 44 to measure a reference noise signal $N_R(t)$ to reduce the effects of ambient noise received at the receiver 48.

Reference noise sensor 44 is added, typically someplace either out of the direct transmission path of the transmitted signal 50 or between the receiver 48 and the source of the noise. Typical reference noise sensor 44 placements include above the slips, above the Kelly, above the injectors, or any other place that would feature a reduced signal from communications unit 40. Sensor 44 detects a noise reference signal $N_R(t)$, which is given a frequency weight (W) at the receiver processor and subtracted from the received signal from the sensor 42. The frequency weight (W) accounts for the frequency response of the transmission path between the noise reference and the sensors and typically apply a gain and phase that changes with frequency. The summation 45 of the received signal from the sensor 42 and the noise-reference sensor 44 result in a receiver signal R(t) which effectively reduces the effects of ambient noise on the transmitted signal 50.

Standard techniques for calculating the frequency weights include numerical modeling, measuring the transfer function, adaptive feed-forward control, and neural networks. Feed-forward techniques are especially appealing because they can adapt to changes in the ambient noise along the transmission path.

The techniques described herein can be utilized individually or combined for more effective noise reduction. Additionally, the techniques described herein teaches filtering techniques including time weights and delays. It is apparent to those skilled in the art that other filters, such as FIR, IIR, state space, non-linear, and sliding mode filters may be utilized to produce a more advanced telemetry system capable of noise cancellation.

The embodiments shown and described above are exemplary. It is not claimed that all of the details, parts, elements, or steps described and shown were invented herein. Even though many characteristics and advantages of the present inventions have been described in the drawings and accompanying text, the description is illustrative only. Changes may be made in the detail, especially in matters of arrangement of the parts or steps within the scope and principles of the inventions. The restrictive description and drawings of the specific examples above do not point out what an infringement of this patent would be, but are to provide at least one explanation of how to use and make the inventions. The limits of the inventions and the bounds of the patent protection are measured by and defined in the following claims.

The invention claimed is:

1. A method of data transmission in an oil well environment, the oil well having a subterranean wellbore extending from the surface into the earth, the oil well having an acoustic transmission channel along which acoustic signals travel, the method comprising the steps of:

providing an acoustic transmitter assembly at a downhole location in the wellbore, providing an acoustic receiver assembly at an uphole location in the wellbore, the transmitter and receiver assemblies spaced apart along an acoustic transmission channel and electrically isolated from one another;

sending a transmitted signal, the transmitted signal being an acoustic signal, from the transmitter assembly at one or more chosen frequencies, along the acoustic channel, where it is joined by ambient noise traveling along the acoustic channel, the ambient noise distorting the acoustic signal;

sensing the acoustic signal, as distorted, at a series of separate locations by providing a plurality of spaced apart receivers at the receiver assembly, the receivers provided along a length of the acoustic channel at a first and at least one subsequent location, the receivers electrically connected to one another;

sensing the acoustic signal as distorted by the ambient noise at the plurality of receivers, the receivers providing corresponding receiver electrical output signals, the electrical output signals corresponding to the received distorted transmitted signal; and combining the receiver electrical output signals to provide a combined receiver signal, the combined receiver signal being less distorted than any one of the receiver electrical output signals.

2. The method according to claim 1, wherein the acoustic transmission path includes an oilfield metallic tubular.

3. The method according to claim 1, wherein the plurality of receivers comprises at least three spaced apart receivers.

4. The method of claim 3 wherein the acoustic signal is transmitted at one or more selected frequencies and the plurality of receivers are spaced apart a distance greater than one tenth of a wavelength of the transmitted signal.

5. The method according to claim 1, wherein the acoustic signal is transmitted at one or more selected frequencies as a primary signal and a plurality of time-delayed replicas thereof.

6. The method of claim 1 wherein combining of the output signals includes multiplication of the signals.

7. The method according to claim 1, wherein the acoustic signal is transmitted at a selected frequency and further comprising the steps of:

placing a noise-reference sensor at a location near the receiver assembly;

sensing ambient noise in the acoustic channel at the noise-reference sensor, the noise-reference sensor providing a corresponding electrical signal;

weighting the electrical noise-reference signal;

combining the weighted electrical noise-reference signal with the measured sensor output.

8. The method of claim 7 wherein the weights are reconfigurable and adapting the weights to minimize the distorting effect of the acoustic noise.

* * * * *